US009491655B2

(12) United States Patent
Gao et al.

(10) Patent No.: US 9,491,655 B2
(45) Date of Patent: *Nov. 8, 2016

(54) ADAPTIVE CONTROL OF CROWDSOURCING DATA USING MOBILE DEVICE GENERATED PARAMETERS

(71) Applicant: QUALCOMM Incorporated, San Diego, CA (US)

(72) Inventors: Weihua Gao, San Jose, CA (US); Sai Pradeep Venkatraman, Santa Clara, CA (US); Ju-Yong Do, Palo Alto, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,439

(22) Filed: Sep. 4, 2015

(65) Prior Publication Data

US 2015/0382227 A1    Dec. 31, 2015

Related U.S. Application Data

(63) Continuation of application No. 13/725,289, filed on Dec. 21, 2012, now Pat. No. 9,151,824.

(51) Int. Cl.
*H04W 24/00* (2009.01)
*G01C 21/00* (2006.01)
(Continued)

(52) U.S. Cl.
CPC ............ *H04W 24/10* (2013.01); *G01S 5/0252* (2013.01); *H04W 4/025* (2013.01); *G08G 1/0104* (2013.01); *G08G 1/0112* (2013.01); *G08G 1/0141* (2013.01); *H04W 64/00* (2013.01)

(58) Field of Classification Search
CPC . H04W 64/003; H04W 4/025; H04W 88/12; H04W 24/02; H04W 28/02; H04W 28/16; G08G 1/0104; G08G 1/0112; G08G 1/0141; G01S 5/0252
USPC ......... 455/456.1, 456.5, 456.6; 701/468, 469
See application file for complete search history.

(56) References Cited

U.S. PATENT DOCUMENTS 5,710,974 A    1/1998 Granlund et al.
7,580,362 B2    8/2009 Timus
(Continued)

OTHER PUBLICATIONS

US 8,295,856, 10/2012, Bamba et al. (withdrawn)
(Continued)

*Primary Examiner* — Duc M Nguyen
(74) *Attorney, Agent, or Firm* — Silicon Valley Patent Group LLP

(57) ABSTRACT

Method and apparatus for controlling crowdsourcing data are disclosed. The method may include comparing a set of access points detected in an area of a wireless environment by the mobile device to a set of known access points for the area, determining a level of crowdsourcing based at least in part on the comparison, where the level of crowdsourcing controls a quantity of crowdsourcing data to be collected, uploaded, or a combination thereof by the mobile device, and performing crowdsourcing, at least in part, in accordance with the determined level of crowdsourcing, where the determined level of crowdsourcing affects a frequency of crowdsourcing operations to be performed by the mobile device, a type of quantization to be applied to crowdsourcing data collected, or some combination thereof.

20 Claims, 10 Drawing Sheets

(51) Int. Cl.
    *H04W 24/10*     (2009.01)
    *H04W 4/02*     (2009.01)
    *G01S 5/02*     (2010.01)
    *G08G 1/01*     (2006.01)
    *H04W 64/00*     (2009.01)

(56) References Cited

U.S. PATENT DOCUMENTS

| | | | |
|---|---|---|---|
| 8,208,943 | B2 | 6/2012 | Petersen et al. |
| 8,793,062 | B2 | 7/2014 | Fino |
| 9,047,774 | B2 * | 6/2015 | Tseng ............... G08G 1/096766 |
| 9,084,122 | B2 * | 7/2015 | Gao ..................... H04W 48/16 |
| 9,151,824 | B2 * | 10/2015 | Gao ..................... H04W 4/025 |
| 9,167,551 | B2 * | 10/2015 | Gao ..................... H04W 48/20 |
| 9,313,767 | B2 * | 4/2016 | Venkatraman ...... H04W 64/003 |
| 9,335,175 | B2 * | 5/2016 | Zhang .................. G01C 21/206 |
| 2004/0063438 | A1 | 4/2004 | Hsu et al. |
| 2004/0073361 | A1 | 4/2004 | Tzamaloukas et al. |
| 2008/0108371 | A1 | 5/2008 | Alizadeh-Shabdiz et al. |
| 2008/0176583 | A1 | 7/2008 | Brachet et al. |
| 2009/0017855 | A1 | 1/2009 | Kwon et al. |
| 2009/0149197 | A1 | 6/2009 | Morgan et al. |
| 2009/0175189 | A1 * | 7/2009 | Alizadeh-Shabdiz  H04W 64/006 370/252 |
| 2009/0312036 | A1 | 12/2009 | Alizadeh-Shabdiz |
| 2010/0070128 | A1 | 3/2010 | Johnson |
| 2011/0002219 | A1 | 1/2011 | Kim et al. |
| 2011/0035420 | A1 * | 2/2011 | Alizadeh-Shabdiz .... G01S 5/02 707/812 |
| 2011/0153805 | A1 | 6/2011 | Beninghaus et al. |
| 2011/0159886 | A1 | 6/2011 | Kangas et al. |
| 2011/0165892 | A1 | 7/2011 | Ristich et al. |
| 2011/0173015 | A1 | 7/2011 | Chapman et al. |
| 2011/0182238 | A1 | 7/2011 | Marshall et al. |
| 2011/0235532 | A1 * | 9/2011 | Alizadeh-Shabdiz  G01S 5/0278 370/252 |
| 2011/0286437 | A1 * | 11/2011 | Austin ................... H04W 4/02 370/338 |
| 2012/0052883 | A1 | 3/2012 | Austin et al. |
| 2012/0178477 | A1 | 7/2012 | Morgan et al. |
| 2012/0303556 | A1 | 11/2012 | Lin et al. |
| 2012/0309420 | A1 * | 12/2012 | Morgan .................. G01S 5/02 455/456.1 |
| 2013/0018826 | A1 | 1/2013 | Sundararajan et al. |
| 2013/0110392 | A1 | 5/2013 | Kosseifi et al. |
| 2013/0116965 | A1 | 5/2013 | Lin et al. |
| 2014/0036768 | A1 | 2/2014 | Gao et al. |
| 2014/0068778 | A1 * | 3/2014 | Bhatia ..................... H04W 4/02 726/26 |
| 2014/0179237 | A1 | 6/2014 | Gao et al. |

OTHER PUBLICATIONS

International Search Report and Written Opinion—PCT/US2013/071043—ISA/EPO—Apr. 11, 2014.
Taiwan Search Report—TW102144482—TIPO—Jan. 19, 2015.

* cited by examiner

| Tile<br>602<br>(Infrequently used)<br>(Crowdsourcing Level 9) | Tile<br>604<br>(Infrequently used)<br>(Crowdsourcing Level 9) | Tile<br>606<br>(Infrequently used)<br>(Crowdsourcing Level 8) |
|---|---|---|
| Tile<br>608<br>(Infrequently used)<br>(Crowdsourcing Level 5) | Tile<br>610<br>(Routinely used)<br>(Crowdsourcing Level 2) | Tile<br>612<br>(Work - routinely used)<br>(Crowdsourcing Level 1) |
| Tile<br>614<br>(Home - routinely used)<br>(Crowdsourcing Level 1) | Tile<br>616<br>(Routinely used)<br>(Crowdsourcing Level 2) | Tile<br>618<br>(Infrequently used)<br>(Crowdsourcing Level 5) |

FIG. 6

ADAPTIVE CONTROL OF CROWDSOURCING DATA USING MOBILE DEVICE GENERATED PARAMETERS

CROSS REFERENCE TO RELATED APPLICATIONS

This application is a continuation of U.S. non-provisional application Ser. No. 13/725,289, "Adaptive Control of Crowdsourcing Data Using Mobile Device Generated Parameters" filed Dec. 21, 2012. The aforementioned United States application is hereby incorporated by reference in its entirety.

FIELD

The present disclosure relates to the field of wireless communications. In particular, the present disclosure relates to adaptive crowdsourcing using mobile device generated parameters.

BACKGROUND

Building and maintaining urban WiFi access point (AP) databases can benefit positioning and navigation applications. In conventional approaches for building and maintaining urban WiFi AP databases, a crowdsourcing server would periodically send instructions to all crowdsourcing mobile clients instructing them how to collect crowdsourcing data. One issue with this approach is that such instructions may unnecessarily flood the network and waste valuable bandwidth of the mobile clients. However, without such periodic crowdsourcing instructions sent from the crowdsourcing server to the mobile clients, the crowdsourcing server may not get sufficient data from the mobile clients, which in turn may lead to poor quality of the WiFi AP database. In addition, the mobile clients may send excessive redundant data to flood the server, which not only may waste the mobile clients' valuable bandwidth and data storage space, it may also cause the crowdsourcing server to consume additional effort to search and extract useful data from the mobile clients.

Therefore, there is a need for methods and systems that can address the above issues of conventional solutions.

SUMMARY

The present disclosure relates to adaptive crowdsourcing using mobile device generated parameters. According to embodiments of the present disclosure, a method of crowdsourcing comprises monitoring environment of a mobile device, determining one or more mobile device generated parameters in accordance with the environment of the mobile device, determining a level of crowdsourcing in accordance with one or more mobile device generated parameters corresponding to the environment, and performing crowdsourcing in accordance with the level of crowdsourcing determined. According to aspects of the present disclosure, the level of crowdsourcing comprises at least one of: quantity of crowdsourcing data to be collected by the mobile device, frequency of crowdsourcing operations to be performed by the mobile device, and type of quantization to be applied to the crowdsourcing data collected.

In one exemplary implementation, the method of determining a level of crowdsourcing in accordance with the one or more mobile device generated parameters comprises monitoring the horizontal estimated position error (HEPE) of the mobile device with respect to the environment. The method further comprises increasing the level of crowdsourcing in response to the HEPE being greater than a first threshold value, and decreasing the level of crowdsourcing in response to the HEPE being less than a second threshold value.

In another exemplary implementation, the method of determining a level of crowdsourcing in accordance with the one or more mobile device generated parameters comprises at least one of: calculating a ratio of number of access points identified in a currently obtained scan list to number of access points identified in a corresponding previously obtained scan list, and calculating a ratio of an average number of access points identified in currently obtained multiple scan lists to the number of access points identified in corresponding previously obtained multiple scan lists. The method further comprises selecting a threshold value for at least one of the ratio of number of access points identified in a currently obtained scan list to number of access points identified in a corresponding previously obtained scan list, and the ratio of an average number of access points identified in currently obtained multiple scan lists to the number of access points identified in corresponding previously obtained multiple scan lists, increasing the level of crowdsourcing in response to the ratio of number of access points identified in a currently obtained scan list to number of access points identified in a corresponding previously obtained scan list being greater than a first threshold value, and decreasing the level of crowdsourcing in response to the ratio of number of access points identified in a currently obtained scan list to number of access points identified in a corresponding previously obtained scan list being less than a second threshold value.

In yet another exemplary implementation, the method of determining a level of crowdsourcing in accordance with the one or more mobile device generated parameters comprises monitoring data size of a tile, where the data size of a tile indicates number of access points in the tile and the tile describes a predetermined area of the environment. The method further comprises decreasing the level of crowdsourcing in response to the data size being greater than a first threshold value, and increasing the level of crowdsourcing in response to the data size being less than a second threshold value.

In yet another exemplary implementation, the method of determining a level of crowdsourcing in accordance with the one or more mobile device generated parameters comprises comparing results of a plurality of positioning methods. The method further comprises increasing the level of crowdsourcing in response to results of a GNSS positioning method being more accurate than results of a WiFi positioning method.

In yet another exemplary implementation, the method of determining a level of crowdsourcing in accordance with the one or more mobile device generated parameters comprises monitoring a history of usage of the mobile device in one or more tiles. The method further comprises increasing the level of crowdsourcing in response to the mobile device being in a tile having a frequency of use lower than a first threshold value, and decreasing the level of crowdsourcing in response to the mobile device being in a tile having a frequency of use higher than a second threshold value.

In yet another exemplary implementation, the method of determining a level of crowdsourcing in accordance with the one or more mobile device generated parameters comprises receiving a crowdsourcing level interactively at the mobile device. The method further comprises increasing the level of crowdsourcing in response to the crowdsourcing level received being higher than current crowdsourcing level, and decreasing the level of crowdsourcing in response to the crowdsourcing level received being lower than current crowdsourcing level.

In yet another embodiment, an apparatus comprises an access point crowdsourcing module including processing logic, where the processing logic comprises logic configured to monitor an environment of a mobile device, logic configured to determine one or more mobile device generated parameters in accordance with the environment of the mobile device, logic configured to determine a level of crowdsourcing in accordance with the one or more mobile device generated parameters, and logic configured to perform crowdsourcing in accordance with the level of crowdsourcing determined.

In yet another embodiment, a non-transitory medium storing instructions for execution by one or more computer systems, the instructions comprise instructions for monitoring an environment of a mobile device, instructions for determining one or more mobile device generated parameters in accordance with the environment of the mobile device, instructions for determining a level of crowdsourcing in accordance with the one or more mobile device generated parameters, and instructions for performing crowdsourcing in accordance with the level of crowdsourcing determined.

In yet another embodiment, a system comprises means for monitoring an environment of a mobile device, means for determining one or more mobile device generated parameters in accordance with the environment of the mobile device, means for determining a level of crowdsourcing in accordance with the one or more mobile device generated parameters, and means for performing crowdsourcing in accordance with the level of crowdsourcing determined.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 6 illustrates yet another exemplary method of performing crowdsourcing based at least in part on a crowdsourcing level according to some aspects of the present disclosure.

DESCRIPTION OF EMBODIMENTS

Embodiments of methods and apparatuses for crowdsourcing are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

According to some aspects of the present disclosure, the disclosed embodiments improve the efficiency of the crowdsourcing effort. In some implementations, the method uses a set of parameters that may be available on mobile devices to control the crowdsourcing activities automatically according to predetermined levels of crowdsourcing effort, such as aggressive, medium, low, minimum, etc. Note that the adaptive crowdsourcing process may also be configured to support human intervention. The disclosed methods may be employed as an automatic background running process.

Figure 1A:
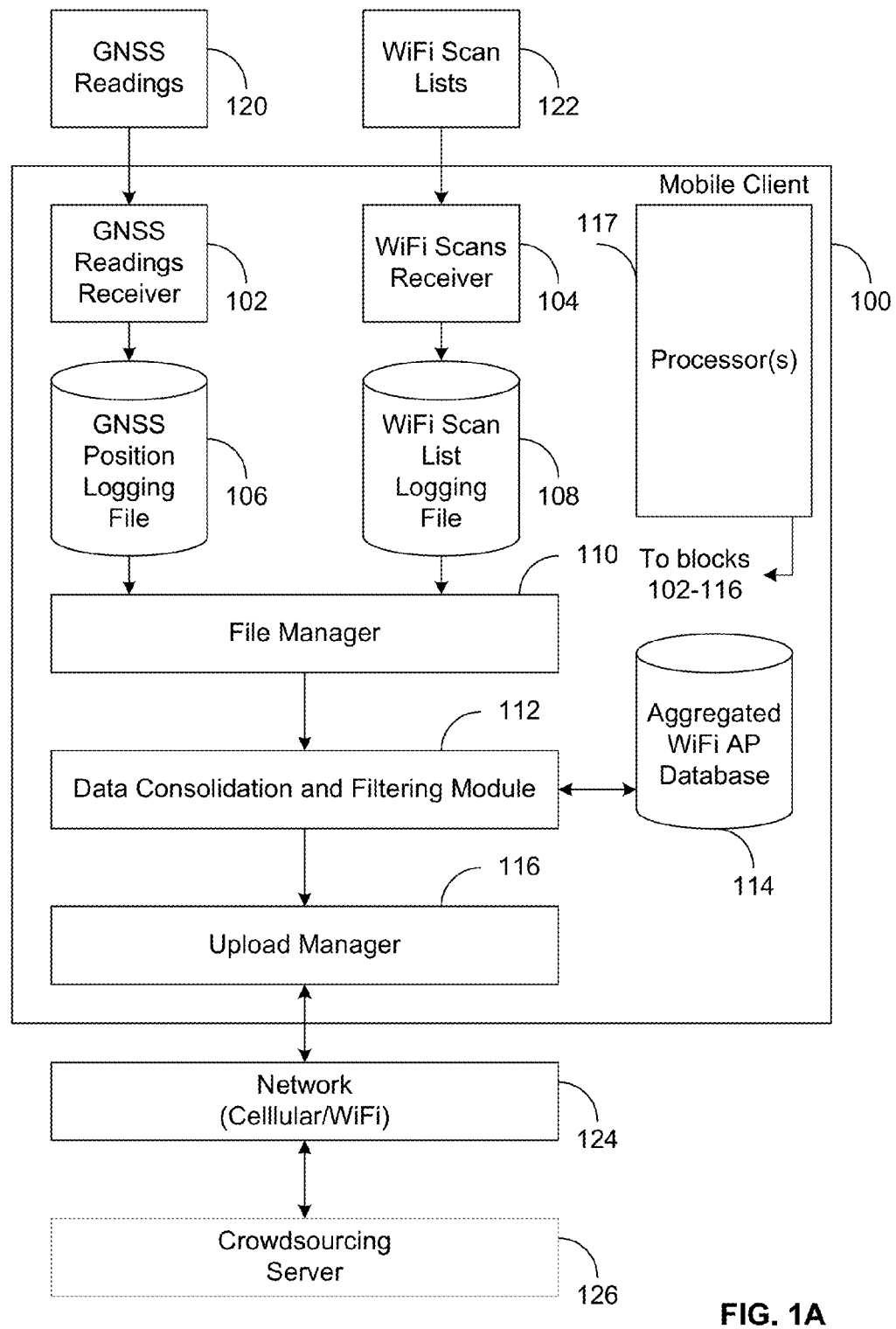
FIG. 1A-1B illustrates an exemplary crowdsourcing system according to some aspects of the present disclosure.
Figure 1B:
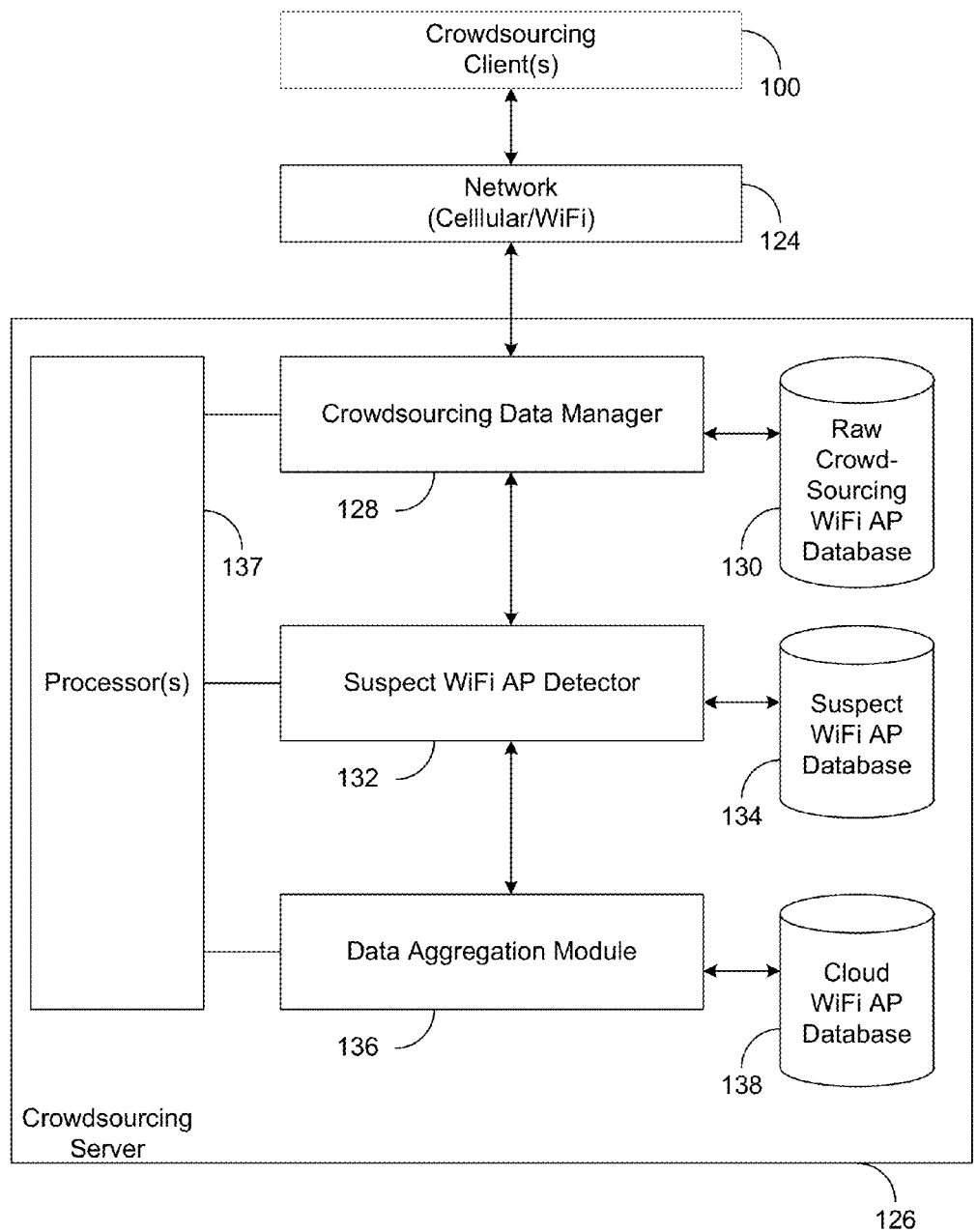

FIG. 1A-1B illustrates an exemplary crowdsourcing system according to some aspects of the present disclosure. The crowdsourcing system includes one or more crowdsourcing client(s) 100 (also referred to as mobile clients) and a crowdsourcing server 126. As shown in FIG. 1A, the mobile client 100 includes GNSS (global navigation satellite system) readings receiver 102, WiFi scans receiver 104, GNSS position logging file 106, WiFi scan list logging file 108, file manager 110, data consolidation and filtering module 112, aggregated WiFi AP database 114, upload manager 116, and one or more processors 117. The GNSS readings receiver 102 receives GNSS readings 120 and uses this information to update the GNSS position logging file 106. Similarly, the WiFi scans receiver 104 receives WiFi scan lists 122 and uses this information to update the WiFi scan list logging file 108. The file manager 110 matches WiFi scan observations in the WiFi scan list logging file 108 to their corresponding GNSS positions in the GNSS position logging file 106. The data consolidation and filtering module 112 takes input from the file manager 110 to generate a local aggregated WiFi AP file, which is stored in the aggregated WiFi AP database 114. The upload manager 116 is configured to upload the consolidated and filtered WiFi AP data and sends the information to a crowdsourcing server 126 via a communication network 124. The one or more processors 117 can be configured to work with GNSS reading receiver 102, WiFi scans receiver 104, file manager 110, data consolidation and filtering module 112, and upload manager 116 to perform the functions described by each of the blocks.

In the exemplary block diagram shown in FIG. 1B, the crowdsourcing server 126 includes crowdsourcing data manager 128, suspect WiFi AP detector 132, data aggregation module 136, and one or more processors 137. The crowdsourcing data manager 128 communicates with one or more crowdsourcing clients 100 via network 124 (such as a cellular or WiFi network), which may be a cellular network or a WiFi network. The crowdsourcing data manager 128 gathers crowdsourcing WiFi AP data from the crowdsourcing clients 100 and stores the data in the raw crowdsourcing WiFi AP database 130. The suspect WiFi AP detector 132 receives crowdsourcing WiFi AP data from the crowdsourcing data manager 128 and detects certain access points that may be questionable regarding the mobility and existence of such access points. The questionable access points are stored in the suspect WiFi AP database 134. The data aggregation module 136 receives crowdsourcing WiFi AP data from the suspect WiFi AP detector 132, and consolidates such data in the cloud WiFi AP database 138. The one or more processors 137 can be configured to work with crowdsourcing data manager 128, suspect WiFi detector 132, and data aggregation module 136 to perform the functions described by each of the blocks.

According to exemplary implementations of the present disclosure, various mobile device generated parameters may be used to determine a level of crowdsourcing effort, including but not limited to: 1) horizontal estimated position error (HEPE) and horizontal dilution of precision (HDOP) obtained from urban WiFi positioning methods; 2) the AP ratio in newly obtained scan list or the mean AP ratio in multiple scan lists; 3) tile size; 4) results of different positioning methods; 5) history of usage of a mobile device in one or more tiles; and 6) user inputs. In the following descriptions, various examples of crowdsourcing levels are provided for illustration purposes. In some examples, a crowdsourcing level 1 may be considered as a low effort of crowdsourcing (for example crowdsourcing less) may be performed. A crowdsourcing level 10 may be considered as a high effort of crowdsourcing (for example crowdsourcing more) may be performed. There may be various crowdsourcing levels, such as 2 to 9, that represent different efforts of crowdsourcing between level 1 and level 10. The number of crowd sourcing levels can be pre-determined and may include as many levels as desired, for example 1-4 levels, alternatively 1-10, alternatively 1-100 levels, alternatively 1-1000 levels, to adequately balance the need for data, desired power savings, redundancy of data provided. The variations in crowdsourcing levels may be adjusted by, including but not limited to: 1) quantity of crowdsourcing data to be collected by the mobile device; 2) frequency of crowdsourcing operations to be performed by the mobile device; and 3) type of quantization to be applied to the crowdsourcing data collected.

Figure 2:
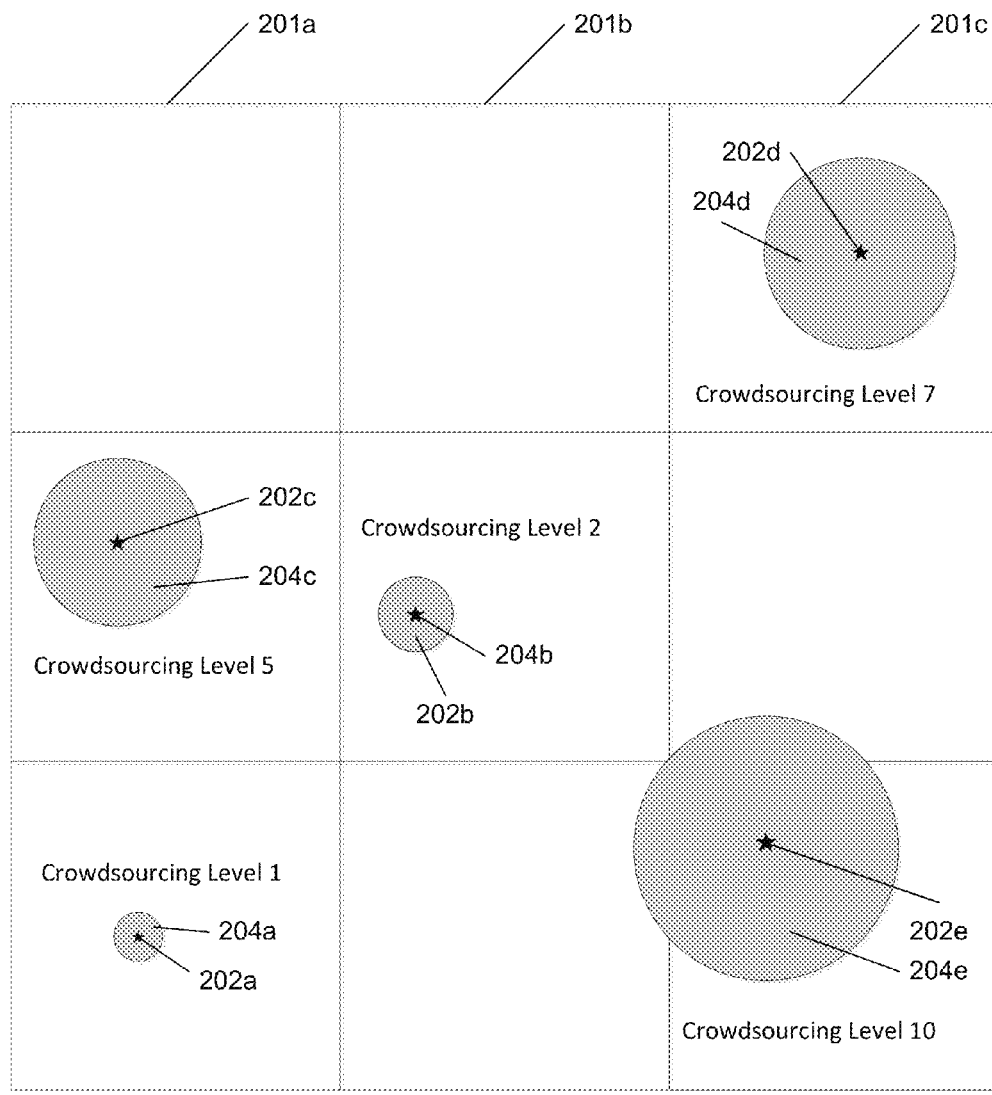
FIG. 2 illustrates an exemplary method of performing crowdsourcing based at least in part on a crowdsourcing level according to some aspects of the present disclosure.

FIG. 2 illustrates an exemplary method of performing crowdsourcing based at least in part on a crowdsourcing level according to some aspects of the present disclosure. According to aspects of the present disclosure, a geographical area may be partitioned into smaller units of area, such as a series of tiles, where each tile covers a portion of the geographical area. A square, such as 201a, 201b, or 201c, may be used to represent a tile. Note that although a tile is drawn as a square for simplicity of illustration in various examples shown herein, according to aspects of the present disclosure, a tile may take any shape or form, such as hexagon or rectangle, to represent a unit of crowdsourcing target area. A position of a mobile device and its corresponding HEPE may be represented by a star (e.g. 202c) and a circle (e.g. 204c), respectively.

In one exemplary implementation, in determining a user's position, the mobile device may be configured to use information of APs obtained (scanned) in the environment. In one approach, the mobile device can be configured to determine a position and its corresponding position uncertainty (also referred to as HEPE). Note that the determination of HEPE may use relative geometry of anchors, which may also be referred to as HDOP. Thus, according to aspects of the present disclosure, HEPE and HDOP may be used as indicators for determining levels of crowdsourcing to be performed. As a result, a position with a relatively large HEPE may use a higher crowdsourcing level; while a position with a relatively small HEPE may use a lower crowdsourcing level.

For example in FIG. 2, for a mobile device at location 202a and having a HEPE as indicated by circle 204a, a low level of crowdsourcing, for example level 1 may be performed. Similarly, for a mobile device at location 202b and having a HEPE as indicated by circle 204b, a crowdsourcing level 2 may be performed. For a mobile device at location 202c and having a HEPE as indicated by circle 204c, a medium level of crowdsourcing, for example level 5 may be performed. For a mobile device at location 202d and having a HEPE as indicated by circle 204d, a crowdsourcing level 7 may be performed. For a mobile device at location 202e and having a HEPE indicated by circle 204e, a high level of crowdsourcing, for example level 10 may be performed. As shown in this example, as the HEPE of the position of a mobile device becomes larger, a higher level of crowdsourcing may be employed in order to obtain additional data for determining a more accurate location of the mobile device. In some implementations, by using its HEPE information with respect to the environment, the mobile device may be able to determine a level of crowdsourcing and perform the level of crowdsourcing determined automatically without instructions from a crowdsourcing server.

Figure 3:
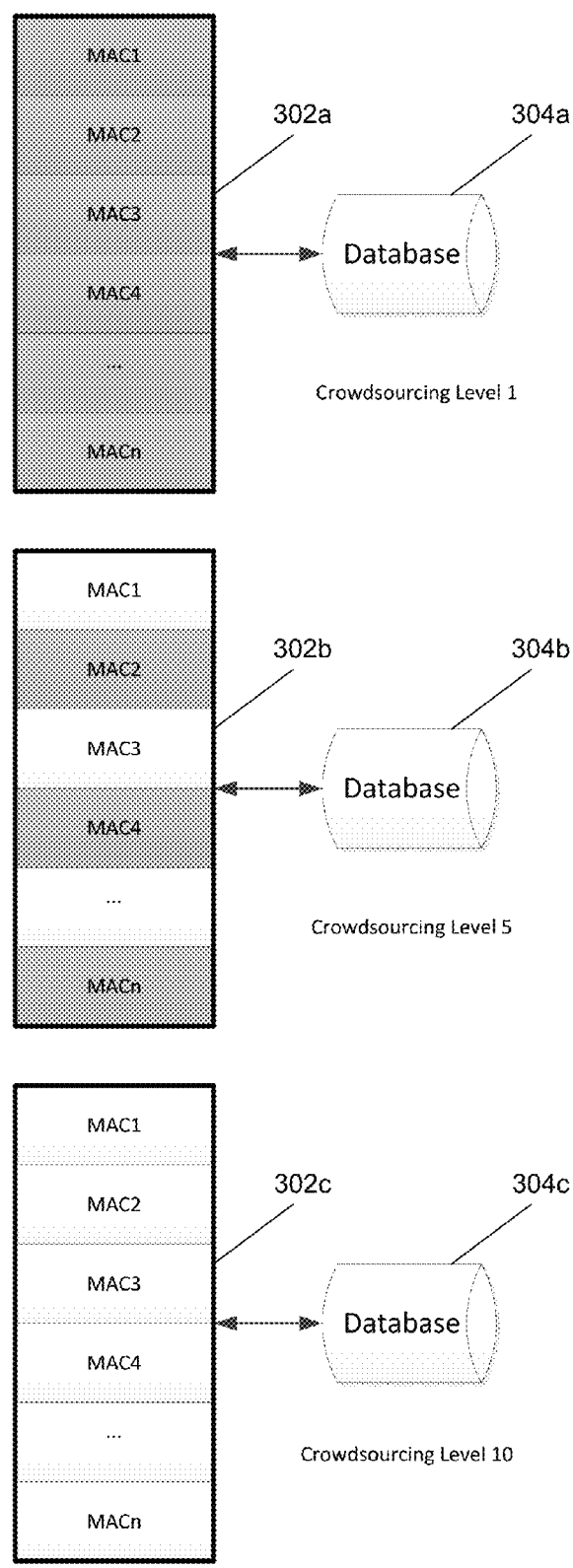
FIG. 3 illustrates another exemplary method of performing crowdsourcing based at least in part on a crowdsourcing level according to some aspects of the present disclosure.

FIG. 3 illustrates another exemplary method of performing crowdsourcing based at least in part on a crowdsourcing level according to some aspects of the present disclosure. In some implementations, WiFi scan lists and their corresponding location descriptions may be obtained by observing at least one access point device within a tile, and compiling information observed about the at least one access point device to form the WiFi scan lists and their corresponding location descriptions. Note that the information observed about the at least one access point device comprises observation time, latitude, longitude, altitude, horizontal uncertainty, and vertical uncertainty of the at least one access point being observed. The information observed about the at least one access point device further comprises MAC (media access control) address, SSID (service set identifier), RSSI (received signal strength indication), RTT (round-trip time), radio specification and frequency band. The location descriptions include at least one of GNSS (global navigation satellite system) position measurement information and non-GNSS position measurement information.

In an exemplary implementation, a ratio of (Number of APs that are not in the database)/(Number of APs in a scan list) of an area of interest can be measured, and this ratio may be referred to as the AP ratio. If the AP ratio is low, it may mean that crowdsourcing has not been performed on some of the APs in the area. Thus, the mobile device may be configured to choose a higher crowdsourcing level to perform crowdsourcing more aggressively for the area. In the example shown in FIG. 3, scan list 302a includes a plurality of APs indicated by media access control (MAC) addresses MAC1 through MACn. An AP in the scan list 302a that has a grey color (e.g. each of MAC1 through MACn) indicates the AP already exists in database 304a. In this example, since all the APs already exist in database 304a, a crowdsourcing level 1 may be performed by the mobile device. For another example, in scan list 302b, some of the APs are colored grey (e.g. MAC2, MAC4, and MACn) while some other APs are not colored grey (e.g. MAC1 and MAC3), indicating the other APs that are not colored grey do not exist in database 304b. Thus, a crowdsourcing level 5 may be performed by the mobile device. For yet another example, in scan list 302c, none of the APs are colored grey, indicating that none of the APs exist in database 304c. Thus, a crowdsourcing level 10 may be performed by the mobile device. As shown in this example, as the ratio of (Number of APs that are not in the database)/(Number of APs in a scan list) increases, a higher level of crowdsourcing may be employed. In some embodiments, the ratio of (Number of APs that are not in the database)/(Number of APs in a scan list) may be compared to a threshold to determine the level of crowdsourcing. Alternatively, multiple scan lists can be provided and the ratio of (average number of access points identified in currently obtained multiple scan lists/number of access points identified in corresponding previously obtained multiple scan lists may be compared to a threshold to determine the level of crowdsourcing.

Figure 4:
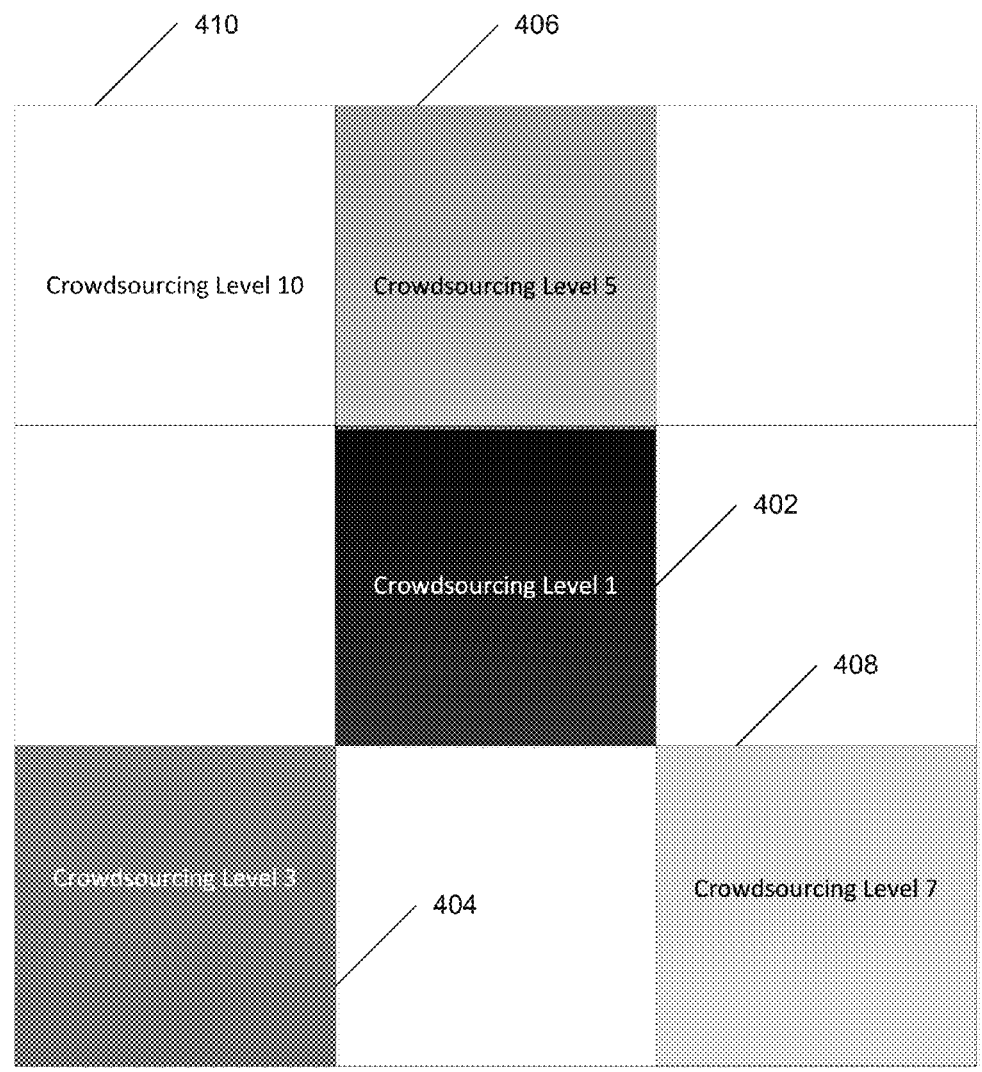
FIG. 4 illustrates yet another exemplary method of performing crowdsourcing based at least in part on a crowdsourcing level according to some aspects of the present disclosure.

FIG. 4 illustrates yet another exemplary method of performing crowdsourcing based at least in part on a crowdsourcing level according to some aspects of the present disclosure. In this example, when a mobile device downloads information about a tile, data size associated with the tile (also referred to as the tile size) can be obtained. The crowdsourcing level may be adjusted according to the data size of the tile. For example, in an area like Hong Kong, certain tiles may have about half a million APs within them. When a mobile device is located in such a tile having densely populated APs, it may use a lower or minimum effort to do crowdsourcing. In some other situations, when a mobile device is located in a tile having sparsely populated APs, it may use a higher or maximum effort to do crowdsourcing. In yet other situations, in an effort to manage the size of an AP database, servers may perform a tile thinning operation to create a downsized version of a tile description. Thus, if a mobile device downloads a downsized version of a tile description, it may also use a lower of minimum effort to do crowdsourcing when it is in that tile.

As shown in FIG. 4, the darkness of a tile indicates how densely or sparsely populated with APs in the tile. For simplicity of illustration, a tile having a dark color indicates it is densely populated, while a tile having a light color (or no color) indicates it is sparsely populated. In this example, a low level of crowdsourcing, for example level 1 may be performed for tile 402; crowdsourcing level 3 may be performed for tile 404; a medium level of crowdsourcing, for example level 5 may be performed for tile 406; crowdsourcing level 7 may be performed for tile 408; and a high level of crowdsourcing, for example level 10 may be performed for tile 410. As shown in this example, as the density of APs in a tile decreases, a higher level of crowdsourcing may be performed. Similarly, as the density of APs in a tile increases, a lower level of crowdsourcing may be performed. In some implementations, by using the information of the number of APs in a tile, the mobile device may be able to determine a level of crowdsourcing and perform the level of crowdsourcing determined automatically without instructions from a crowdsourcing server.

Figure 5:
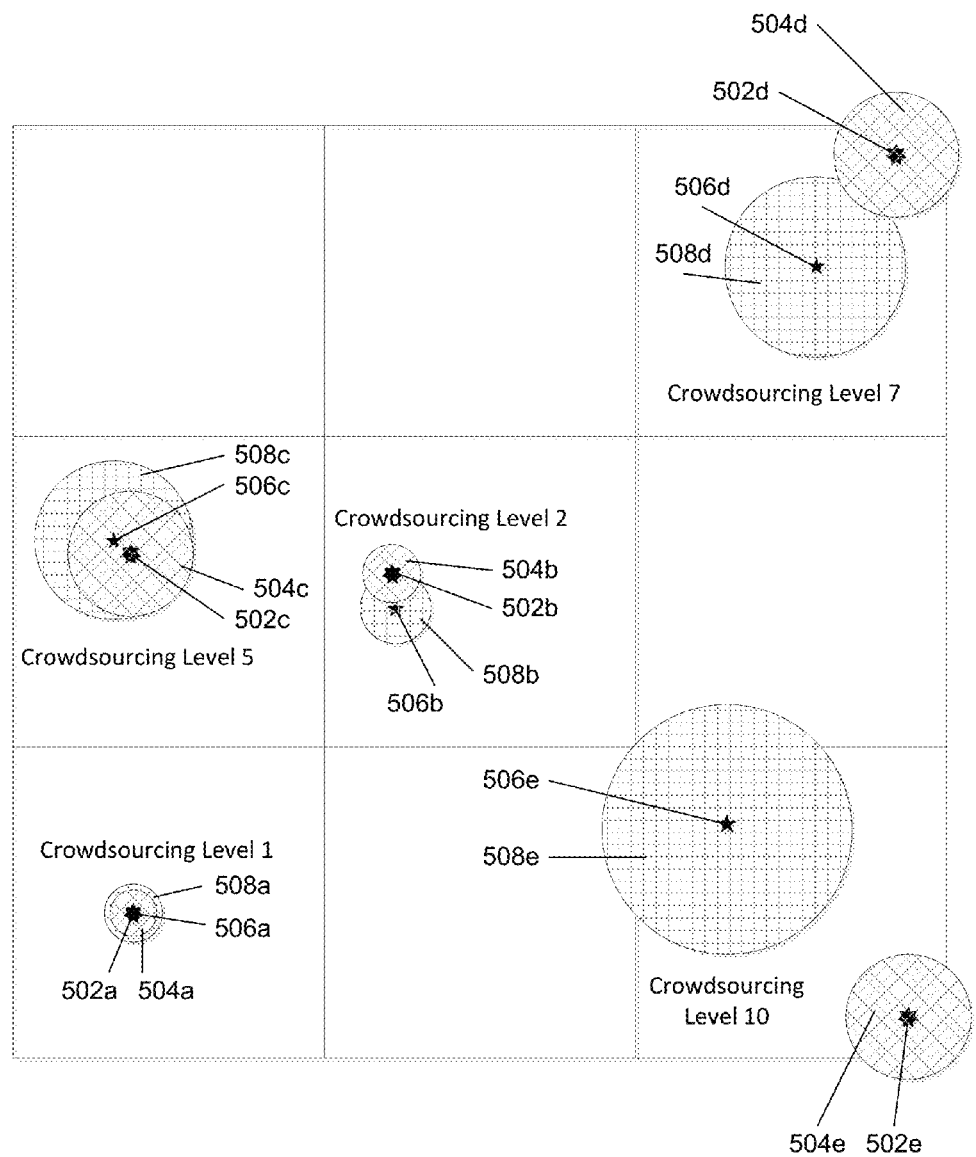
FIG. 5 illustrates yet another exemplary method of performing crowdsourcing based at least in part on a crowdsourcing level according to some aspects of the present disclosure.

FIG. 5 illustrates yet another exemplary method of performing crowdsourcing based at least in part on a crowdsourcing level according to some aspects of the present disclosure. In an exemplary implementation, a mobile device may obtain its location through two or more positioning methods, for example through an urban WiFi system or through a GNSS system, at approximately the same time. If results obtained from multiple positioning methods differ, the difference between the results obtained from multiple positioning methods may trigger the mobile device to perform different levels of crowdsourcing for an area. For example, based on a predetermined number of comparisons (e.g. 5), if the HEPE obtained from the GNSS system is different from the HEPE obtained from the urban WiFi system, different levels of crowdsourcing may be performed for the area based on the comparisons.

In the example shown in FIG. 5, star 502a indicates a location and circle 504a indicates the corresponding HEPE of a mobile device obtained from a GNSS system; star 506a indicates a location and circle 508a indicates the corresponding HEPE of the mobile device obtained from an urban WiFi system. In this case, the location of the mobile device identified by the two positioning methods is substantially the same, and their corresponding HEPEs are also substantially overlapping each other. Based on these results, crowdsourcing level 1 may be performed by the mobile device. For another example, star 502b indicates a location and circle 504b indicates the corresponding HEPE of a mobile device obtained from a GNSS system; star 506b indicates a location and circle 508b indicates the corresponding HEPE of the mobile device obtained from an urban WiFi system. Based on these results, crowdsourcing level 2 may be performed by the mobile device. For yet another example, star 502c indicates a location and circle 504c indicates the corresponding HEPE of a mobile device obtained from a GNSS system; star 506c indicates a location and circle 508c indicates the corresponding HEPE of the mobile device obtained from an urban WiFi system. Based on these results, crowdsourcing level 5 may be performed by the mobile device. For yet another example, star 502d indicates a location and circle 504d indicates the corresponding HEPE of a mobile device obtained from a GNSS system; star 506d indicates a location and circle 508d indicates the corresponding HEPE of the mobile device obtained from an urban WiFi system. Based on these results, crowdsourcing level 7 may be performed by the mobile device. For yet another example, star 502e indicates a location and circle 504e indicates the corresponding HEPE of a mobile device obtained from a GNSS system; star 506e indicates a location and circle 508e indicates the corresponding HEPE of the mobile device obtained from an urban WiFi system. Based on these results, crowdsourcing level 10 may be performed by the mobile device. As shown in this example, as the results obtained from different positioning methods further deviate from each other, a higher level of crowdsourcing may be performed.

FIG. 6 illustrates yet another exemplary method of performing crowdsourcing based at least in part on a crowdsourcing level according to some aspects of the present disclosure. In some implementations, the mobile client may be configured to detect and store the tiles and the APs within the tiles it may frequently use. For example, the mobile device may be configured to detect and store the tile that includes the user's home, and the tile that includes the user's work place. According to aspects of the present disclosure, locations where the user frequently used may be referred to as routine places and their corresponding tiles may be referred to as frequently (or routinely) used tiles. Locations where the user infrequently used may be referred to as infrequently used tiles. Based on the information of routine places and their corresponding frequently used tiles, the crowdsourcing level may be adjusted accordingly.

In the example shown in FIG. 6, tile 602 and tile 604 may represent infrequently used tiles and crowdsourcing level 9 may be performed by the mobile device when it is in these tiles. For another example, tile 606 may represent an infrequently used tile and crowdsourcing level 8 may be performed by the mobile device when it is in this tile. For yet another example, tile 608 and tile 618 may represent infrequently used tiles and crowdsourcing level 5 may be performed by the mobile device when it is in these tiles. For yet another example, tile 610 and tile 616 may represent frequently used tiles and crowdsourcing level 2 may be performed by the mobile device when it is in these tiles. For yet another example, tile 612 may include the user's work place and tile 614 may include the user's home. These tiles are considered as frequently used tiles, and crowdsourcing level 1 may be performed by the mobile device when it is in these tiles. As shown in this example, for tiles that are routinely used, such as tile 614 that includes the location of home or tile 612 that includes the location of work place, a lower crowdsourcing level may be performed. For tiles that are infrequently used, for example tile 602 and tile 604, a higher crowdsourcing level may be performed. According to aspects of the present disclosure, by using the history of its usage in one or more tiles, the mobile device may be able to determine a level of crowdsourcing and perform the level of crowdsourcing determined automatically without instructions from a crowdsourcing server.

According to aspects of the present disclosure, the user may intervene the methods of crowdsourcing level determination described above and may adjust the crowdsourcing level manually if it is desired to improve the positioning performance of the mobile device.

Figure 7:
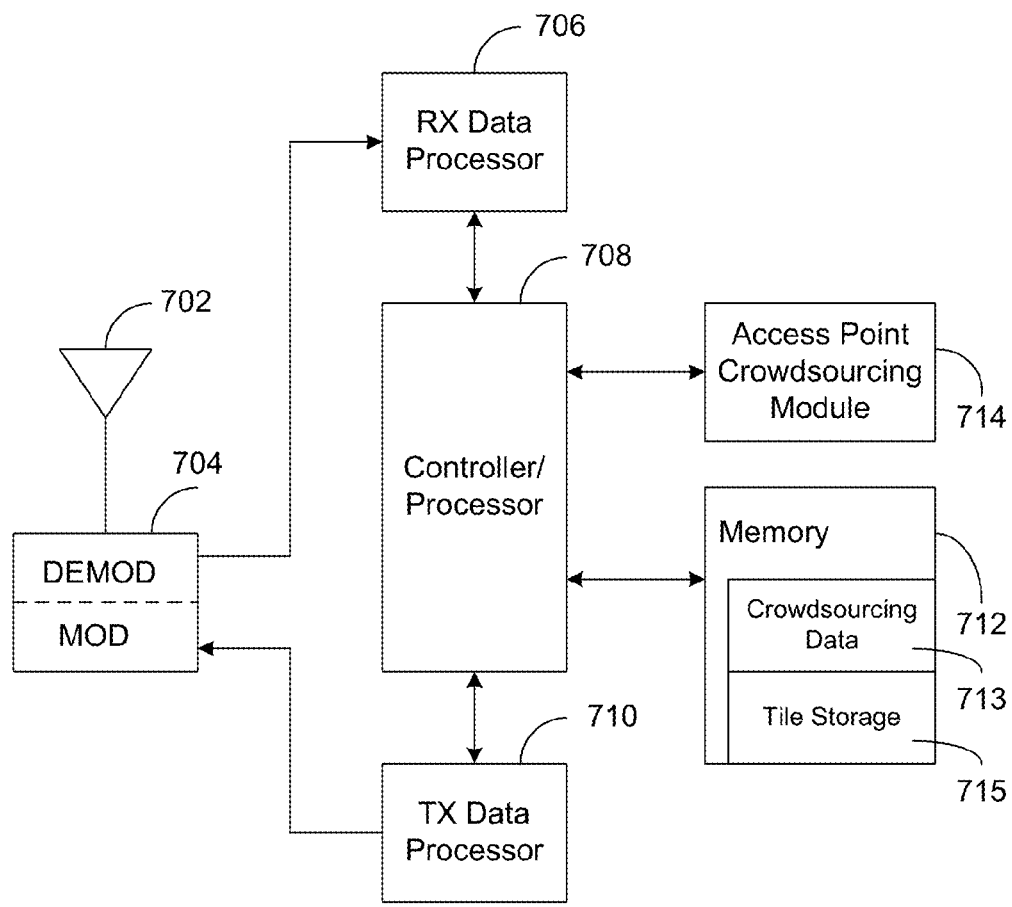
FIG. 7 illustrates an exemplary block diagram of an apparatus for performing crowdsourcing according to some aspects of the present disclosure.

FIG. 7 illustrates an exemplary block diagram of an apparatus for performing crowdsourcing according to some aspects of the present disclosure. In some embodiments, the apparatus illustrated in FIG. 7 and/or described below may be used to implement a mobile client in FIG. 1A, for example the mobile client 100. As shown in FIG. 7, antenna 702 receives modulated signals from a base station and provides the received signals to a demodulator (DEMOD) part of a modem 704. The demodulator processes (e.g., conditions and/or digitizes) the received signal and obtains input samples. It may further perform orthogonal frequency-division multiplexing (OFDM) demodulation on the input samples and provide frequency-domain received symbols for all subcarriers. An RX data processor 706 processes (e.g., symbol de-maps, de-interleaves, and/or decodes) the frequency-domain received symbols and provides decoded data to a controller/processor 708 of the apparatus. In some implementations, the antenna 702 may be configured to receive and/or transmit GNSS signals or other SPS (satellite positioning system) signals from one or more satellites. In some other implementations, the antenna 702 may be configured to receive and/or transmit WiFi signals. Further, separate receive and/or processing circuitry and/or software may be included in the apparatus to process these signal, and may be in communication with the controller/processor 708, memory 712, and/or access point crowdsourcing module 714.

The controller/processor 708 can be configured to control the apparatus to communicate with another device via a wireless network. A TX data processor 710 may generate signaling symbols, data symbols, and/or pilot symbols, for example, which can be processed by modulator (MOD) of modem 704 and transmitted via the antenna 702, for example to a base station or directly to another device. In addition, the controller/processor 708 directs the operation of various processing units at the apparatus. Memory 712 can be configured to store program codes and data for the apparatus, such as crowdsourcing data 713 and tile data 715. Access point crowdsourcing module 714 can be configured to perform methods of processing crowdsourcing described herein. For example, access point crowdsourcing module 714 and/or controller/processor 708 may be used to implement one or more of blocks 802-830 illustrated in FIG. 8. In some implementations, portions of the functionalities of the controller/processor 708 and access point crowdsourcing module 714 may be implemented in multiple apparatuses, such as in one or more mobile devices and/or servers. In some other implementations, controller/processor 708 and access point crowdsourcing module 714 may reside in a mobile device to implement methods of processing crowdsourcing data described in association with FIG. 1A. While the access point crowdsourcing module 714 is illustrated separate from other elements in the apparatus shown in FIG. 7, the access point crowdsourcing module 714 may be wholly or partially implemented by other elements illustrated in FIG. 7, for example in the controller/processor 708 and/or memory 712, or in another processor and/or memory of the apparatus or in one or more other elements of the apparatus.

According to aspects of the present disclosure, by using the methods disclosed above, the number of crowdsourcing instructions may be sent from the crowdsourcing server to mobile devices may be reduced. As a result, the disclosed methods improve battery life, data usage, and data storage at the mobile devices. Note that the methods of crowdsourcing described herein may be performed periodically as a background task automatically, so that it may minimize any interference to the user of the mobile device.

Figure 8A:
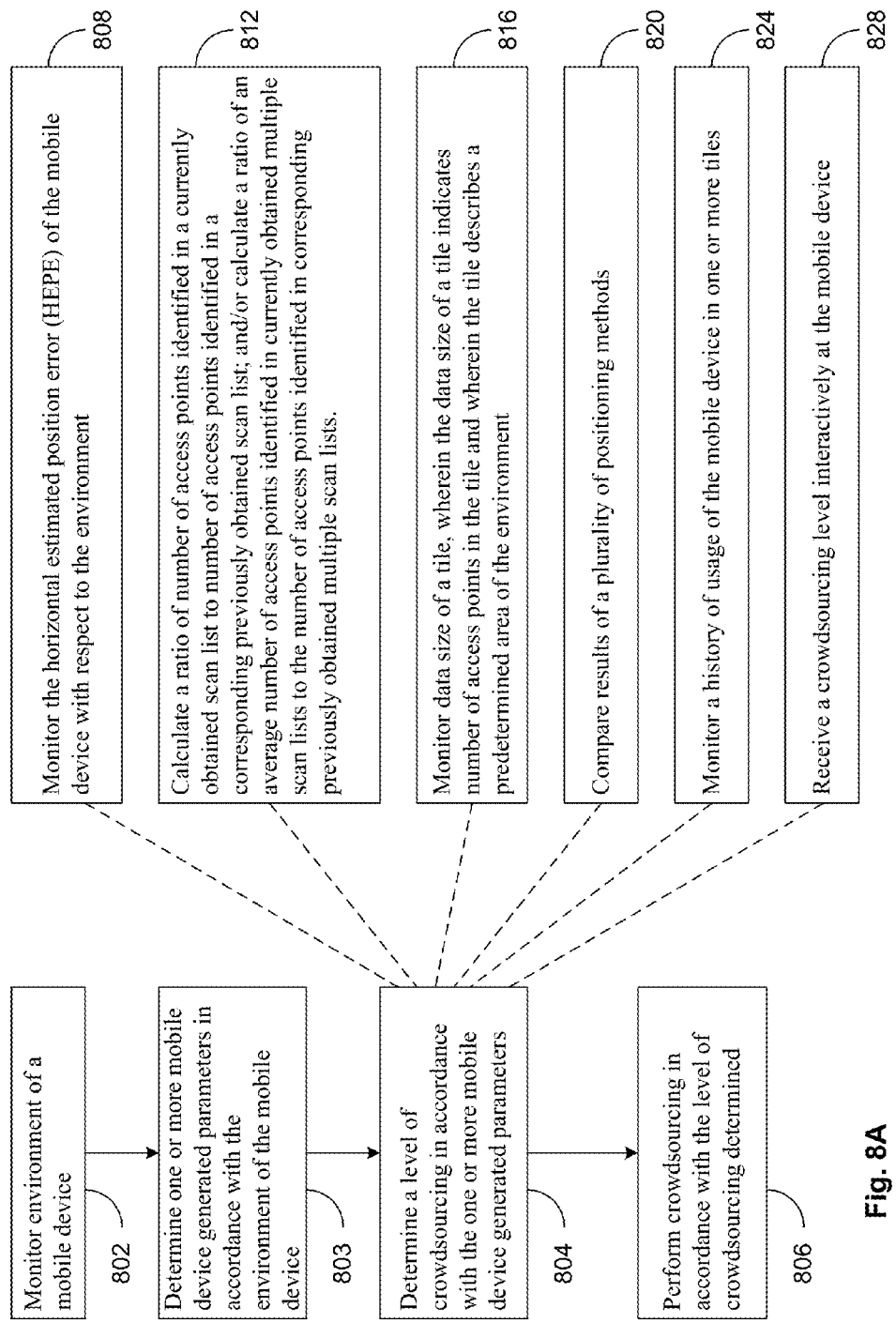
FIG. 8A-8B illustrates a flow chart of performing crowdsourcing according to some aspects of the present disclosure.
Figure 8B:
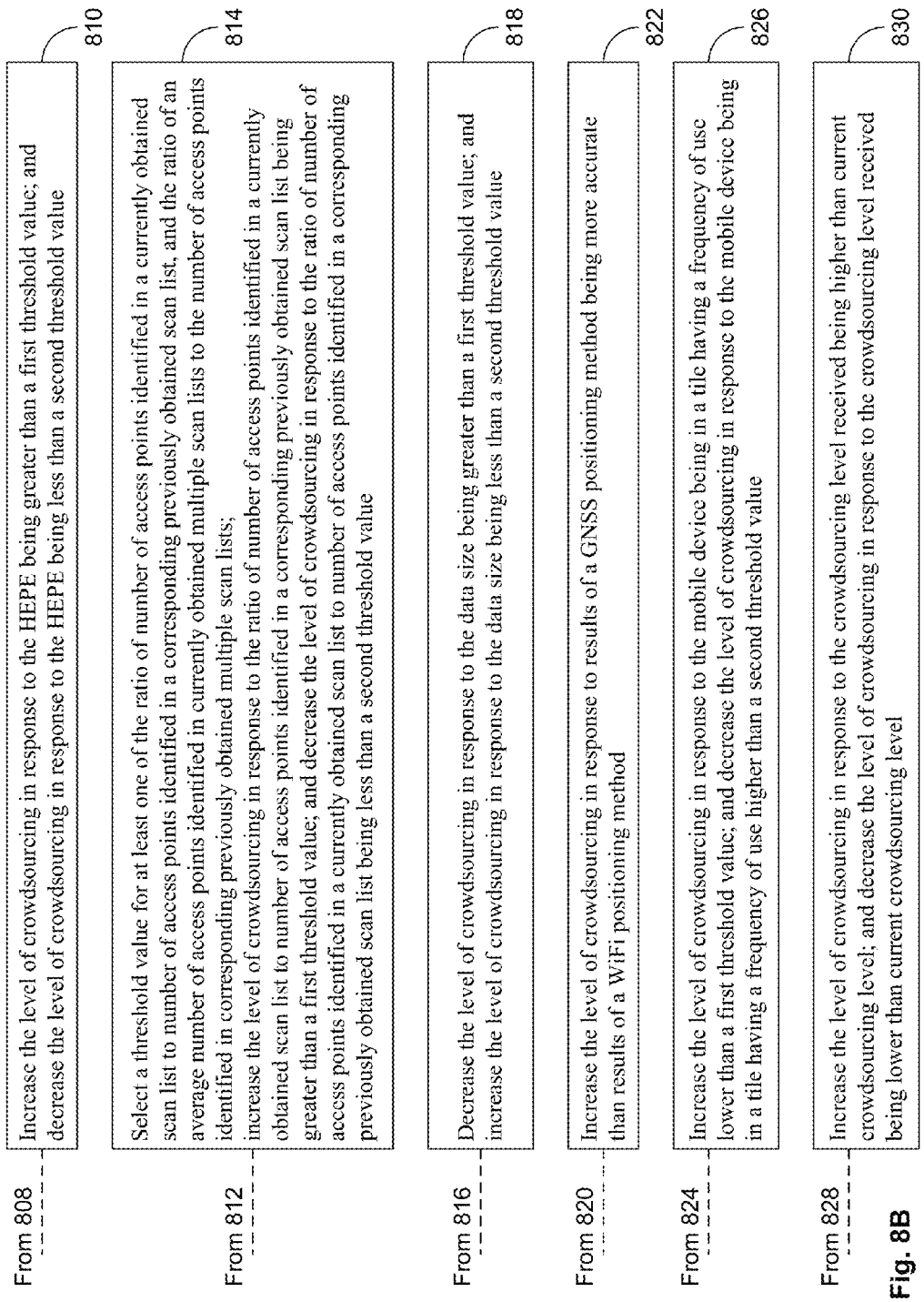

FIG. 8A-8B illustrates a flow chart of performing crowdsourcing according to some aspects of the present disclosure. In block 802, the processor 708 and/or access point crowdsourcing module 714 can be configured to monitor an environment of a mobile device. In block 803, the processor 708 and/or access point crowdsourcing module 714 can be configured to determine one or more mobile device generated parameters in accordance with the environment of the mobile device. In block 804, the processor 708 and/or access point crowdsourcing module 714 can be configured to determine a level of crowdsourcing in accordance with the one or more mobile device generated parameters. In block 806, the processor 708 and/or access point crowdsourcing module 714 can be configured to perform crowdsourcing in accordance with the level of crowdsourcing determined. According to aspects of the present disclosure, the level of crowdsourcing comprises at least one of: quantity of crowdsourcing data to be collected by the mobile device, frequency of crowdsourcing operations to be performed by the mobile device, and type of quantization to be applied to the crowdsourcing data collected.

According to embodiments of the present disclosure, the methods performed in block 804 may further include methods performed in blocks 808 to 830. In block 808, the processor 708 and/or access point crowdsourcing module 714 can be configured to monitor the horizontal estimated position error (HEPE) of the mobile device with respect to the environment. In block 810, the processor 708 and/or access point crowdsourcing module 714 can be configured increase the level of crowdsourcing in response to the HEPE being greater than a first threshold value, and decrease the level of crowdsourcing in response to the HEPE being less than a second threshold value.

In block 812, the processor 708 and/or access point crowdsourcing module 714 can be configured to calculate a ratio of number of access points identified in a currently obtained scan list to number of access points identified in a corresponding previously obtained scan list; and/or calculate a ratio of an average number of access points identified in currently obtained multiple scan lists to the number of access points identified in corresponding previously obtained multiple scan lists. In block 814, the processor 708 and/or access point crowdsourcing module 714 can be configured to select a threshold value for at least one of the ratio of number of access points identified in a currently obtained scan list to number of access points identified in a corresponding previously obtained scan list, and the ratio of an average number of access points identified in currently obtained multiple scan lists to the number of access points identified in corresponding previously obtained multiple scan lists, increase the level of crowdsourcing in response to the ratio of number of access points identified in a currently obtained scan list to number of access points identified in a corresponding previously obtained scan list being greater than a first threshold value, and decrease the level of crowdsourcing in response to the ratio of number of access points identified in a currently obtained scan list to number of access points identified in a corresponding previously obtained scan list being less than a second threshold value.

In block 816, the processor 708 and/or access point crowdsourcing module 714 can be configured to monitor data size of a tile, where the data size of a tile indicates number of access points in the tile and the tile describes a predetermined area of the environment. In block 818, the processor 708 and/or access point crowdsourcing module 714 can be configured to decrease the level of crowdsourcing in response to the data size being greater than a first threshold value, and increase the level of crowdsourcing in response to the data size being less than a second threshold value.

In block 820, the processor 708 and/or access point crowdsourcing module 714 can be configured to compare results of a plurality of positioning methods. In block 822, the processor 708 and/or access point crowdsourcing module 714 can be configured to increase the level of crowdsourcing in response to results of a GNSS positioning method being more accurate than results of a WiFi positioning method.

In block 824, the processor 708 and/or access point crowdsourcing module 714 can be configured to monitor a history of usage of the mobile device in one or more tiles. In block 826, the processor 708 and/or access point crowdsourcing module 714 can be configured to increase the level of crowdsourcing in response to the mobile device being in a tile having a frequency of use lower than a first threshold value, and decrease the level of crowdsourcing in response to the mobile device being in a tile having a frequency of use higher than a second threshold value.

In block 828, the processor 708 and/or access point crowdsourcing module 714 can be configured to receive a crowdsourcing level interactively at the mobile device. In block 830, the processor 708 and/or access point crowdsourcing module 714 can be configured to increase the level of crowdsourcing in response to the crowdsourcing level received being higher than current crowdsourcing level, and decrease the level of crowdsourcing in response to the crowdsourcing level received being lower than current crowdsourcing level.

Note that at least the following three paragraphs, FIG. 1A, FIG. 7, FIG. 8A-8B and their corresponding descriptions provide means for monitoring an environment of a mobile device, means for determining one or more mobile device generated parameters in accordance with the environment of the mobile device, means for determining a level of crowdsourcing in accordance with the one or more mobile device generated parameters, and means for performing crowdsourcing in accordance with the level of crowdsourcing determined.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of controlling crowdsourcing data, comprising, at a mobile device:
   comparing a set of access points detected in an area of a wireless environment by the mobile device to a set of known access points for the area;
   determining a level of crowdsourcing based at least in part on the comparison, wherein the level of crowdsourcing controls a quantity of crowdsourcing data to be collected, uploaded, or a combination thereof by the mobile device; and
   performing crowdsourcing, at least in part, in accordance with the determined level of crowdsourcing.

2. The method of claim 1, wherein the determined level of crowdsourcing affects:
   a frequency of crowdsourcing operations to be performed by the mobile device;
   a type of quantization to be applied to crowdsourcing data collected;
   or some combination thereof.

3. The method of claim 1, wherein determining a level of crowdsourcing further comprises, at the mobile device:
   increasing the level of crowdsourcing in response to a determination that a number of access points in the set of known access points does not satisfy a threshold; and
   decreasing the level of crowdsourcing in response to a determination that the number of access points in the set of known access points exceeds the threshold.

4. The method of claim 1, further comprising, at the mobile device:
   determining one or more mobile device generated parameters in accordance with the wireless environment of the mobile device; and
   determining the level of crowdsourcing further in accordance with the one or more mobile device generated parameters.

5. The method of claim 4, wherein determining the level of crowdsourcing in accordance with the one or more mobile device generated parameters comprises, at the mobile device:
   determining at least one mobile device generated parameter based, at least in part on, a history of usage of the mobile device with regard to one or more access points.

6. The method of claim 1, further comprising:
   increasing the level of crowdsourcing in response to results of a GNSS positioning method at the mobile device being determined to be more accurate than results of a WiFi positioning method.

7. A mobile device for controlling crowdsourcing data, comprising:
- a transceiver configured to detect a set of access points in an area of a wireless environment;
- one or more processors configured to
- compare the set of access points detected by the mobile device to a set of known access points for the area;
- determine a level of crowdsourcing based at least in part on the comparison, wherein the level of crowdsourcing controls a quantity of crowdsourcing data to be collected, uploaded, or a combination thereof by the mobile device; and
- perform crowdsourcing, at least in part, in accordance with the determined level of crowdsourcing.

8. The mobile device of claim 7, wherein the determined level of crowdsourcing affects:
- a frequency of crowdsourcing operations to be performed by the mobile device;
- a type of quantization to be applied to crowdsourcing data collected;
- or some combination thereof.

9. The mobile device of claim 7, wherein the one or more processors are further configured to:
- increase the level of crowdsourcing in response to a determination that a number of access points in the set of known access points does not satisfy a threshold; and
- decrease the level of crowdsourcing in response to a determination that the number of access points in the set of known access points exceeds the threshold.

10. The mobile device of claim 7, wherein the one or more processors are further configured to:
- determine one or more mobile device generated parameters in accordance with the wireless environment of the mobile device; and
- determine the level of crowdsourcing further in accordance with the one or more mobile device generated parameters.

11. The mobile device of claim 10, wherein the one or more processors are further configured to:
- determine at least one mobile device generated parameter based, at least in part on, a history of usage of the mobile device with regard to one or more access points.

12. The mobile device of claim 7, wherein the one or more processors are further configured to:
- increase the level of crowdsourcing in response to results of a GNSS positioning method at the mobile device being determined to be more accurate than results of a WiFi positioning method.

13. A mobile device for controlling crowdsourcing data, comprising
- means for comparing a set of access points detected in an area of a wireless environment by the mobile device to a set of known access points for the area;
- means for determining a level of crowdsourcing based at least in part on the comparison, wherein the level of crowdsourcing controls a quantity of crowdsourcing data to be collected, uploaded, or a combination thereof by the mobile device; and
- means for performing crowdsourcing, at least in part, in accordance with the determined level of crowdsourcing.

14. The mobile device of claim 13, wherein the determined level of crowdsourcing affects:
- a frequency of crowdsourcing operations to be performed by the mobile device;
- a type of quantization to be applied to crowdsourcing data collected;
- or some combination thereof.

15. The mobile device of claim 13, wherein the means for determining a level of crowdsourcing further comprises:
- means for increasing the level of crowdsourcing in response to a determination that a number of access points in the set of known access points does not satisfy a threshold; and
- means for decreasing the level of crowdsourcing in response to a determination that the number of access points in the set of known access points exceeds the threshold.

16. The mobile device of claim 13, further comprising:
- means for determining one or more mobile device generated parameters in accordance with the wireless environment of the mobile device; and
- means for determining the level of crowdsourcing further in accordance with the one or more mobile device generated parameters.

17. The mobile device of claim 16, wherein the means for determining the level of crowdsourcing in accordance with the one or more mobile device generated parameters comprises:
- means for determining at least one mobile device generated parameter based, at least in part on, a history of usage of the mobile device with regard to one or more access points.

18. The mobile device of claim 13, further comprising:
- means for increasing the level of crowdsourcing in response to results of a GNSS positioning method at the mobile device being determined to be more accurate than results of a WiFi positioning method.

19. A non-transitory computer-readable storage medium including instructions stored thereon that, when executed, cause one or more processors of a mobile device to:
- compare a set of access points detected in an area of a wireless environment by the mobile device to a set of known access points for the area;
- determine a level of crowdsourcing based at least in part on the comparison, wherein the level of crowdsourcing controls a quantity of crowdsourcing data to be collected, uploaded, or a combination thereof by the mobile device; and
- perform crowdsourcing, at least in part, in accordance with the determined level of crowdsourcing.

20. The non-transitory computer-readable storage medium of claim 19, wherein the determined level of crowdsourcing affects:
- a frequency of crowdsourcing operations to be performed by the mobile device;
- a type of quantization to be applied to crowdsourcing data collected;
- or some combination thereof.

* * * * *